US011859853B2

(12) United States Patent
Jaweesh

(10) Patent No.: US 11,859,853 B2
(45) Date of Patent: Jan. 2, 2024

(54) SELF-ADHESIVE FLEXIBLE MINERAL-WOOL LAMINATES FOR INSULATION OF METALLIC SHEET DUCTS OR CAVITIES

(71) Applicant: KUWAIT INSULATING MATERIAL MANUFACTURING CO. SAK, Shuaiba (KW)

(72) Inventor: Manhal Abdulrazak Jaweesh, Shuaiba (KW)

(73) Assignee: KUWAIT INSULATING MATERIAL MANUFACTURING CO. SAK, Shuaiba (KW)

( * ) Notice: Subject to any disclaimer, the term of this patent is extended or adjusted under 35 U.S.C. 154(b) by 371 days.

(21) Appl. No.: 17/292,523

(22) PCT Filed: Nov. 20, 2019

(86) PCT No.: PCT/IB2019/059979
§ 371 (c)(1),
(2) Date: May 10, 2021

(87) PCT Pub. No.: WO2020/104965
PCT Pub. Date: May 28, 2020

(65) Prior Publication Data
US 2021/0396423 A1 Dec. 23, 2021

(30) Foreign Application Priority Data
Nov. 23, 2018 (EP) ..................................... 18207978

(51) Int. Cl.
*F24F 13/02* (2006.01)
*B32B 7/12* (2006.01)
(Continued)

(52) U.S. Cl.
CPC ............ *F24F 13/0263* (2013.01); *B32B 7/12* (2013.01); *B32B 19/041* (2013.01);
(Continued)

(58) Field of Classification Search
CPC ...... F24F 13/0263; B32B 7/12; B32B 19/041; B32B 19/045; B32B 19/06;
(Continued)

(56) References Cited

U.S. PATENT DOCUMENTS 5,277,955 A * 1/1994 Schelhorn ............... B32B 27/12
428/220
5,685,938 A * 11/1997 Knapp ...................... E04B 1/78
156/212
(Continued)

FOREIGN PATENT DOCUMENTS

| JP | H05-104691 A | 4/1993 |
|---|---|---|
| JP | H06-238798 A | 8/1994 |

(Continued)

OTHER PUBLICATIONS

International Search Report dated Mar. 16, 2020 in PCT/IB2019/059979, 3 pages.
(Continued)

*Primary Examiner* — Patricia L. Nordmeyer
(74) *Attorney, Agent, or Firm* — Element IP, PLC

(57) ABSTRACT

The invention is drawn to flexible self-adhesive mineral wool laminate, comprising—a mineral wool insulation mat with a first and second main face, —a first facing laminated onto the first main face of the mineral wool insulation mat, —a second facing which is a double-sided adhesive structure adhered with one if its adhesive faces to the second main face of the mineral wool insulation mat, the other adhesive face being made of or comprising a pressure sensitive adhesive, the laminate being characterized by the
(Continued)

fact that the double-sided adhesive structure comprises a plurality of through-holes, and to use of such laminates for insulating metallic sheet ducts or cavities.

20 Claims, 1 Drawing Sheet

(51) Int. Cl.
  *B32B 19/04* (2006.01)
  *B32B 19/06* (2006.01)
  *F16L 59/02* (2006.01)
(52) U.S. Cl.
  CPC ............ *B32B 19/045* (2013.01); *B32B 19/06* (2013.01); *F16L 59/028* (2013.01); *F16L 59/029* (2013.01); *B32B 2307/102* (2013.01); *B32B 2307/304* (2013.01); *B32B 2307/72* (2013.01); *B32B 2307/732* (2013.01); *B32B 2307/748* (2013.01); *B32B 2571/00* (2013.01)
(58) Field of Classification Search
  CPC ........ B32B 2307/102; B32B 2307/304; B32B 2307/72; B32B 2307/732; B32B 2307/748; B32B 2571/00; B32B 27/308; B32B 2255/10; B32B 5/022; B32B 27/281; B32B 27/32; B32B 2255/26; B32B 2262/10; B32B 3/266; B32B 5/024; B32B 5/028; B32B 5/18; B32B 7/06; B32B 15/20; B32B 19/047; B32B 27/304; B32B 27/36; B32B 27/40; F16L 59/028; F16L 59/029; F16L 59/026; C09J 7/29; C09J 7/385
  See application file for complete search history.

(56) References Cited

U.S. PATENT DOCUMENTS

| 6,207,245 | B1 | 3/2001 | Miller et al. | |
|---|---|---|---|---|
| 2009/0130389 | A1 | 5/2009 | Whitaker et al. | |
| 2014/0154478 | A1* | 6/2014 | Fellinger | C09J 7/22 |
| | | | | 428/350 |
| 2018/0005620 | A1 | 1/2018 | Bush | |
| 2018/0047380 | A1 | 2/2018 | Bush et al. | |
| 2018/0126691 | A1 | 5/2018 | Bush et al. | |
| 2018/0339491 | A1* | 11/2018 | Hursit | B32B 5/20 |
| 2019/0100458 | A1* | 4/2019 | Ruisi | C03C 25/14 |

FOREIGN PATENT DOCUMENTS

| JP | 2012505978 A | 3/2012 |
|---|---|---|
| JP | 2015007193 A | 1/2015 |
| WO | WO-9707968 A1 | 3/1997 |
| WO | WO-2017162955 A1 | 9/2017 |

OTHER PUBLICATIONS

Written Opinion dated Mar. 16, 2020 in PCT/IB2019/059979, 5 pages.

* cited by examiner

SELF-ADHESIVE FLEXIBLE MINERAL-WOOL LAMINATES FOR INSULATION OF METALLIC SHEET DUCTS OR CAVITIES

The present invention is drawn to a flexible self-adhesive mineral wool laminate to be used for insulation HVAC systems (heating, ventilation, and air conditioning) or other metallic sheet cavities such as tanks.

Ducts and conduits are used to convey air in building heating, ventilation, and air conditioning (HVAC) systems. These ducts are generally formed of metallic sheets and as a result do not possess good thermal or acoustical properties. In order to improve thermal and acoustical insulation of such ducts, conduits and other cavities made of metallic sheets, it is possible to attach thereto insulating materials based on mineral wool. In some applications flexible mineral wool mats are wrapped around the exterior surface of a duct or conduit. In other applications they are applied to the internal surface of the duct or conduit. Flexible insulation materials based on mineral wool are also interesting for wrapping pipes conveying liquids, such as water or industrial organic fluids, for example oil or gas.

It is known to provide these duct liners or duct wraps based on flexible mineral wool insulation mats with a pressure sensitive layer applied to one main face of the mat, i.e. to the face which will be put into contact with the surface of the metallic sheet of the duct or cavity. The pressure sensitive layer may be very thin or may be applied in a mesh like structure.

This pressure sensitive layer may be covered and protected with a release liner, in particular when the self-adhesive mineral wool laminate is to be packaged in stacked or rolled form.

It is also well known to cover the other face of the mineral wool mat with a facing which will be in contact with the inner or outer atmosphere of the duct or cavity. This facing is for example a non-woven veil, a film or a metal foil. It is either impermeable to air or its permeability to air is at least rather poor.

The Applicant has been confronted with the problem that when the self-adhesive layer was an adhesive structure with rather low or even without air permeability, optionally covered with an air-impermeable release liner, it was impossible to roll the product in compressed form without inducing delaminating such as shown on FIG. 1. This delamination was attributed to the expulsion of air in a direction parallel to the main faces of the mineral wool mat. As a matter of fact, when both the self-adhesive layer, with the optional liner, and the facing on the opposite side of the mat are air impermeable or have only poor air permeability, air cannot be expelled from the mineral wool through the facings.

BRIEF DESCRIPTION OF THE DRAWING

FIG. 1 shows product delamination on rolling.

A solution to this problem could be either to pack the product in non-compressed form or to pack it at very slow compression speed so as to allow the expelled air to flow very slowly through the mineral fiber mat without breaking the binder links between the mineral fibers. Of course none of these solutions is cost effective because they imply respectively a higher product volume to be stored and transported or an undesirable slow-down of the packaging step. Consequently there is still a need for a flexible self-adhesive insulation product allowing high-speed packaging in rolled form at high compression ratios without delamination. The benefice of such a product would be time saving during the packaging step and lower storage and transport costs of the compressed packaged rolled-up product.

The present invention is based on the discovery that it is possible to package the above-described adhesive flexible mineral wool laminates in roll form in a high speed compression step when the adhesive layer or facing, and the optional release liner, comprise through-holes allowing the air to quickly escape through the adhesive layer or facing, i.e. in a direction perpendicular to the main faces of the mineral wool mat.

A first subject-matter is therefore a flexible self-adhesive mineral wool laminate, comprising
  a mineral wool insulation mat with a first and second main face,
  a first facing laminated onto the first main face of the mineral wool insulation mat,
  a second facing which is a double-sided adhesive structure adhered with one if its adhesive faces to the second main face of the mineral wool insulation mat, the other adhesive face being made of or comprising a pressure sensitive adhesive (PSA),
the laminate being characterized by the fact that the double-sided adhesive structure comprises a plurality of through-holes.

Another subject matter of the present application is a method of thermally and/or acoustically insulating metallic sheet ducts or pipes or metallic sheet cavities, said method comprising applying the above flexible self-adhesive mineral wool laminate to a surface of a such a duct, pipe or cavity with the pressure sensitive adhesive face of the second facing being in contact with the duct or cavity.

The self-adhesive laminate of the present invention preferably further comprises a release liner applied to the adhesive structure on the second main face of the insulation mat. Such release liners are well known in the technical field of pressure sensitive adhesives. They generally comprise at least one surface with silicone that allows easy peeling of the PSA. The release liner, when present, covers and protects the adhesive structure and prevents adhesion thereof to the first facing in the rolled-up state.

It goes without saying that the release liner covering the adhesive second facing also comprises a plurality of through-holes, at least a part of which overlap the plurality of through-holes of the double-sided adhesive structure.

The release liner is not compulsory. As a matter of fact, in cases where the outer pressure sensitive adhesive has moderate adhesive strength to the first facing, thereby allowing it to be peeled off the exposed surface of the first facing, one may dispense with such an additional layer.

The release liner is particularly useful when the pressure sensitive adhesive of the adhesive structure is a structural adhesive, i.e. an adhesive with high adhesive strength which can be used to irreversibly bond two materials together.

In a preferred embodiment of the flexible adhesive laminate of the present invention, the through-holes of the release liner overlap the through-holes of the double sided adhesive structure. This can be achieved by perforating a laminate of the release liner and the adhesive structure, before or after application thereof to the mineral wool insulation mat.

In a particularly preferred embodiment the through-holes of the adhesive structure are congruent with the through-holes of the release liner, which means they have the same dimensions, each through-hole in the release liner overlapping a corresponding through-hole in the adhesive structure.

There are different embodiments of the second facing of the laminate. In one embodiment, the double-sided adhesive structure comprises a carrier or support film which is not inherently adhesive but which is coated on both sides with an adhesive coating, at least one of which is a pressure-sensitive adhesive coating.

The carrier can be made of any material appropriate for the use envisaged. It can be based on cellulose fibres, such as paper, or on polymer or glass fibres assembled in the form of nonwovens. The carrier may also be a film based on thermoplastic organic polymers. It can be an expanded film, that is to say a foam.

The polymer forming the carrier of the double-sided adhesive tape may be selected from the group consisting of polyesters, poly(vinyl chloride), fluoropolymers, polyimides, EPDM (ethylene/propylene/diene monomer), polyurethanes, acrylates and polyolefins, such as polyethylene.

Pressure sensitive adhesives (PSAs) are adhesives generally present in the form of a thin layer carried by a support. They adhesively bond virtually immediately, by simple contact and application of a pressure, to the material to be adhesively bonded. Although there exist some PSAs having a very high adhesiveness, the very great majority of PSAs are regarded as non-structural or semi-structural adhesives, that is to say the adhesive bonding is reversible. The glass transition temperature of PSAs is always significantly lower than the operating temperature envisaged. At ambient temperature, the polymer network forming the adhesive layer is thus a viscoelastic fluid, the high mobility of the polymer chains being in fact a condition essential to the formation of a multitude of weak bonds (van der Waals and hydrogen bonds) between the adhesive and the surface to be adhesively bonded.

The PSAs are generally characterized by their tack, their peel strength and their shear strength.

Typically, three main chemical categories of pressure-sensitive adhesives are distinguished:
elastomer-based PSAs,
acrylic PSAs and
silicone-based PSAs.

In another embodiment of the present invention, the double-sided adhesive structure is not a three-layer structure such as described above, but a one-layer structure consisting of a pressure sensitive adhesive film made of a pressure sensitive adhesive polymer.

PSA films as such generally have a very soft consistence due to their low glass transition temperature, they preferably comprise a reinforcing fibrous structure, made of organic or mineral fibers, preferably of fiberglass.

In a preferred embodiment the PSA film is made of an acrylic polymer and has a thickness of about 0.02 to 0.3 mm, more preferably of about 0.05 to 0.20 mm. It preferably comprises a reinforcing mesh or scrim, for example a fiberglass mesh or a polyester or PES/PVA scrim.

Such PSA films are generally provided as a laminate together with the release liner and may be applied as such directly onto the second main face of the mineral wool insulation mat. The through-holes may be perforated before or after application of the laminate to the insulation mat.

Such a PSA/release liner laminate can be purchased for example from the Belgian company "Option Tape Specialities" under the reference 18242.

In a third embodiment of the double-sided adhesive structure forming the second facing of the self-adhesive laminate, the adhesive structure is a layer of a pressure sensitive adhesive directly applied onto the second main face of the mineral wool insulation mat. Such a layer is preferably applied as a fluid hot melt adhesive for example by spraying.

This way of applying the holt melt PSA in fluid form may results in penetration of the adhesive material into the mineral wool insulation mat. The viscosity of the fluid adhesive should be adjusted so that the penetration is limited to the superficial layers of the insulation mat. This application method may also result in a double-sided adhesive structure with is not completely continuous and may have some open porosity. The number and dimensions of these open pores are however preferably insufficient to allow the free passage of air during the roll-up step of the packaging process.

The through-holes in the adhesive structure and optional release layer are preferably regularly distributed over the whole surface of these layers/facings, so as to prevent air being entrapped in large areas of the underlying insulation mat. The through-holes are as "islands" distributed in a "sea" of adhesive surface surrounding the "islands". The number of through-holes per unit surface area depends of course on the size of the through-holes. The smaller the through-holes, the higher must be their surface density.

The total surface area of the through-holes may be comprised in a rather large range, as long as it is high enough to allow enough air to flow through so that delamination in the fiber insulation mat may be prevented, and low enough to still firmly adhere the insulation product to the metallic surface.

The total surface area of the through-holes of the double-sided adhesive structure preferably represents from about 0.05% to about 70%, more preferably from about 0.1 to about 65%, still more preferably from about 1% to about 60%, still more preferably from about 2% to about 50%, and in particular from about 5 to about 25% of the total surface area of the double-sided adhesive structure. The total surface area of the double-sided adhesive structure is the surface area before perforation, i.e. the surface of the perforations ("islands") and of the non-perforated area (adhesive "sea").

The through-holes in the double-sided adhesive structure and in the optional release liner preferably have an average equivalent diameter of between 1 mm and 10 cm, preferably of between 2 mm and 5 cm, more preferably of between 3 mm to 2 cm.

The number of through-holes in the double-sided adhesive structure and the number of through-holes in the optional release liner is preferably comprised between about 5 and 100 per square meter, preferably between 10 and 80 per square meter.

The way of perforating the adhesive structure and the optional release liner is not critical to the present invention. When carried out before application to the mineral wool insulation mat, perforation may be done for example by means of a punching device. When the adhesive structure is perforated after being applied onto the insulation mat, perforation may be carried out in-line for example by means of a roll provided with a plurality of spikes, regularly spaced apart, in aligned or staggered arrangement. The spikes are preferably long enough to penetrate at least a few millimeters into the mineral wool insulation mat.

The structure and chemical nature of the first facing is not critical as long as the first facing may be adhesively bonded to the first main face of the mineral wool insulation mat, resulting in a facing having no or only poor air-permeability.

The first facing may be selected for example from the group consisting of woven and non-woven fabrics, for example glass fiber fabrics, metallic foils, in particular aluminum foils, plastic films, and combinations thereof.

The adhesives used for bonding the first facing to the mineral wool insulation mat may be selected from water-based adhesives, solvent-based adhesives, hot-melt adhesives, thermoplastic adhesives and thermoset adhesives.

The mineral wool insulation mat before application of any of the two facings advantageously has thickness according to EN823 of between 15 mm and 120 mm, preferably of between 20 and 100 mm, and more preferably of between 25 and 80 mm.

Its density is advantageously comprised between 8 and 48 kg/m$^3$, preferably between about 10 and 32 kg/m$^3$, and more preferably between about 15 and 25 kg/m$^3$.

As explained in the introductory part of this description, the through-holes in the adhesive structure (second facing) and optional release liner allow high speed compressive packaging of the self-adhesive laminate in rolled-up form. The laminate is preferably rolled up under compression with the first facing being on the outer side of the roll. It is then packaged in a protective film or container, preferably in a polymer film or polymer bag.

The invention claimed is:

1. A flexible self-adhesive mineral wool laminate, comprising:
    a mineral wool insulation mat with a first main face and second main face;
    a first facing laminated onto the first main face of the mineral wool insulation mat;
    a second facing which is a double-sided adhesive structure adhered with one if its adhesive faces to the second main face of the mineral wool insulation mat, the other adhesive face being made of or comprising a pressure sensitive adhesive,
    wherein the double-sided adhesive structure comprises a plurality of through-holes.

2. The flexible self-adhesive mineral wool laminate according to claim 1, further comprising:
    a release liner covering and protecting the double-sided adhesive structure, said release liner also comprising a plurality of through-holes, at least a part of which overlap with the plurality of through-holes of the double-sided adhesive structure.

3. The flexible self-adhesive mineral wool laminate according to claim 2, wherein the through-holes of the release liner overlap the through-holes of the double-sided adhesive structure.

4. The flexible self-adhesive mineral wool laminate according to claim 3, wherein the through-holes of the release liner are congruent with the through-holes of the double-sided adhesive structure.

5. The flexible self-adhesive mineral wool laminate according to claim 2, wherein the through-holes in the double-sided adhesive structure and in the release liner have an average equivalent diameter of between 1 mm and 10 cm.

6. The flexible self-adhesive mineral wool laminate according to claim 2, wherein the number of through-holes in the double-sided adhesive structure and the number of through-holes in the release liner is comprised between about 5 and 100 per square meter.

7. The flexible self-adhesive mineral wool laminate according to claim 1, wherein the double-sided adhesive structure is a carrier coated on both sides with an adhesive coating, at least one of which is a pressure-sensitive adhesive coating.

8. The flexible self-adhesive mineral wool laminate according to claim 1, wherein the double-sided adhesive structure is a film made of a pressure sensitive adhesive.

9. The flexible self-adhesive mineral wool laminate according to claim 8, wherein the film made of a pressure sensitive adhesive further comprises a reinforcing fibrous structure.

10. The flexible self-adhesive mineral wool laminate according to claim 1, wherein the double-sided adhesive structure is a layer of a pressure sensitive adhesive directly applied onto the second main face of the mineral wool insulation mat.

11. The flexible self-adhesive mineral wool laminate according to claim 1, wherein a total surface area of the through-holes of the double-sided adhesive structure represent from about 0.05% to about 70% of the total surface area of the double-sided adhesive structure.

12. The flexible self-adhesive mineral wool laminate according to claim 1, wherein the through-holes in the double-sided adhesive structure have an average equivalent diameter of between 1 mm and 10 cm.

13. The flexible self-adhesive mineral wool laminate according to claim 1, wherein the number of through-holes in the double-sided adhesive structure is comprised between about 5 and 100 per square meter.

14. The flexible self-adhesive mineral wool laminate according to claim 1, wherein the mineral wool insulation mat has thickness according to EN823 of between 15 mm and 120 mm.

15. The flexible self-adhesive mineral wool laminate according to claim 1, wherein the mineral wool insulation mat has density of between 8 and 48 kg/m$^3$.

16. The flexible self-adhesive mineral wool laminate according to claim 1, wherein the first facing is selected from the group consisting of a woven fabric, a non-woven fabric, a metallic foil, and a plastic film.

17. The flexible self-adhesive mineral wool laminate according to claim 1, wherein the flexible self-adhesive mineral wool laminate is rolled up under compression with the first facing being on the outer side of the roll, and packaged.

18. A method of thermally and/or acoustically insulating metallic sheet ducts or pipes or metallic sheet cavities, the method comprising:
    applying the flexible self-adhesive mineral wool laminate according to claim 1 to a surface of said duct, pipe or cavity with the pressure sensitive adhesive face of the second facing being in contact with the duct or cavity.

19. The flexible self-adhesive mineral wool laminate according to claim 1, wherein the double-sided adhesive structure is a film made of a polyacrylic pressure sensitive adhesive.

20. The flexible self-adhesive mineral wool laminate according to claim 1, wherein a total surface area of the through-holes of the double-sided adhesive structure represent from about 0.1% to about 65% of the total surface area of the double-sided adhesive structure.

* * * * *